United States Patent
Zhao et al.

(10) Patent No.: US 8,493,724 B2
(45) Date of Patent: Jul. 23, 2013

(54) ELECTRONIC DEVICE HAVING HINGE MECHANISM

(75) Inventors: Ting-Ting Zhao, Shenzhen (CN); Min-Li Li, Shenzhen (CN); He-Li Wang, Shenzhen (CN); Chin-Sung Yang, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 174 days.

(21) Appl. No.: 13/214,216

(22) Filed: Aug. 21, 2011

(65) Prior Publication Data
US 2012/0170187 A1    Jul. 5, 2012

(30) Foreign Application Priority Data
Dec. 29, 2010   (CN) .......................... 2010 1 0612839

(51) Int. Cl.
*H05K 5/00* (2006.01)
(52) U.S. Cl.
USPC .................................................... 361/679.27

(58) Field of Classification Search
USPC ....................................... 361/679.27–679.29
See application file for complete search history.

(56) References Cited

U.S. PATENT DOCUMENTS

| 7,133,280 B2 * | 11/2006 | Love .......................... 361/679.07 |
| 2006/0056144 A1 * | 3/2006 | Tsukami et al. ............ 361/683 |

\* cited by examiner

*Primary Examiner* — Ramon Barrera
(74) *Attorney, Agent, or Firm* — Altis Law Group, Inc.

(57) ABSTRACT

A hinge mechanism for securing to the body of an electronic device. The hinge mechanism includes a fixing plate. A holding member and two latching members project from the base of the electronic device. An end of the holding member opposite to the base bends toward the at least one latching member to form a latching portion. Each latching member includes a connecting portion projecting from the base, a supporting portion bending from an end of the connecting portion opposite to the base, and a hook arranged at a side of the supporting portion opposite to the connecting portion. The holding member cooperates with the supporting portion to define a clearance for holding the fixing plate, the hooks cooperate with the holding member to secure the fixing plate to the body.

19 Claims, 4 Drawing Sheets

ELECTRONIC DEVICE HAVING HINGE MECHANISM

BACKGROUND

1. Technical Field

The present disclosure relates to electronic devices; and particularly to an electronic device having a hinge mechanism.

2. Description of Related Art

An electronic device, such as a DVD player, includes a body, a cover, and a hinge mechanism for rotatably connecting the cover to the body. The hinge mechanism is generally fixed to the body by a plurality of fixing members, such as bolts or screws. However, it takes a lot of time to secure the hinge mechanism to the body with the bolts or screws.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout four views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
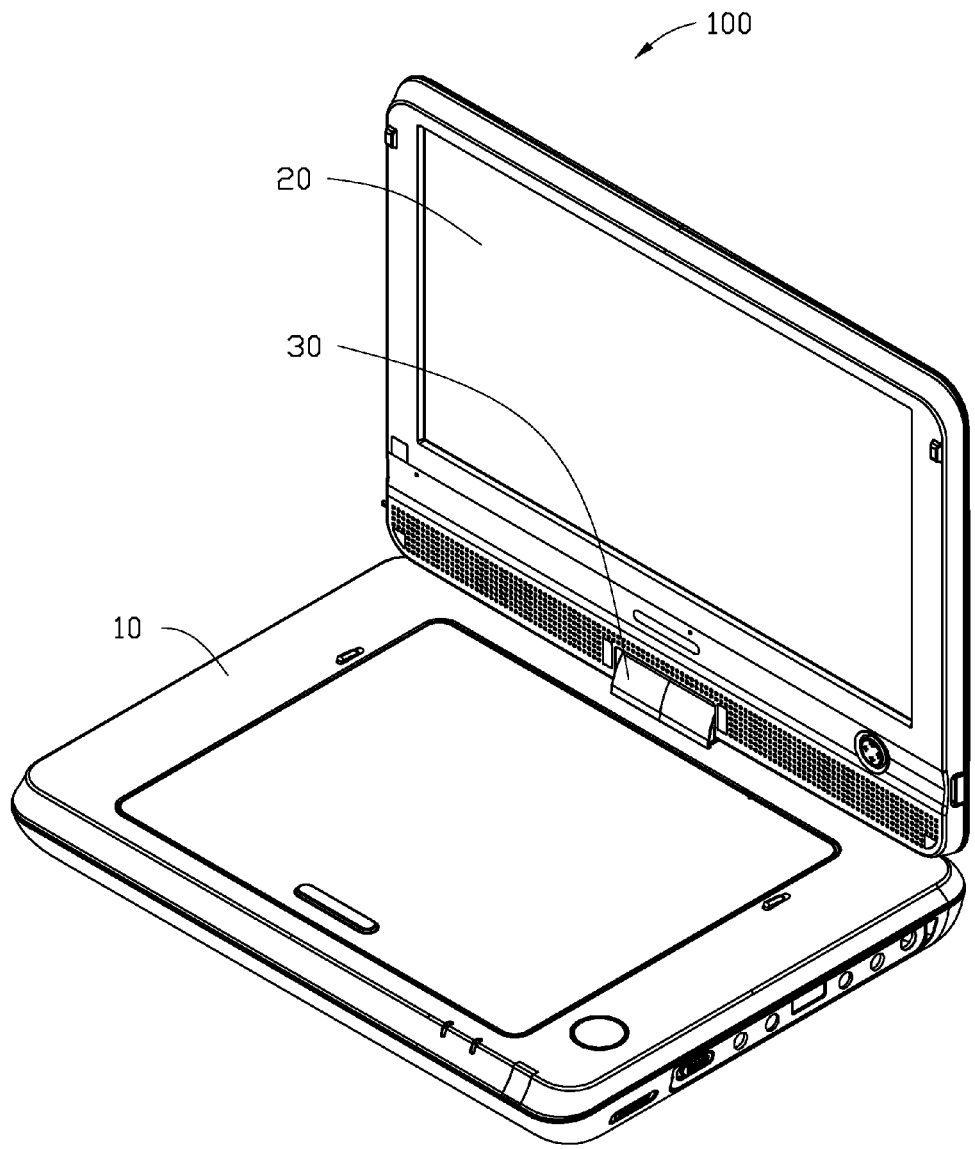
FIG. 1 is a perspective view of an electronic device in accordance with an exemplary embodiment; the electronic device includes a body, a cover, and a hinge mechanism for connecting the cover to the body.

Referring to FIG. 1, a perspective view of an electronic device 100 in accordance with an embodiment is shown. The electronic device 100 includes a body 10, a cover 20 rotatably mounted to the body 10, and a hinge mechanism 30 for rotatably connecting the cover 20 to the body 10. In the embodiment, the electronic device 100 may be a portable disc player.

Figure 2:
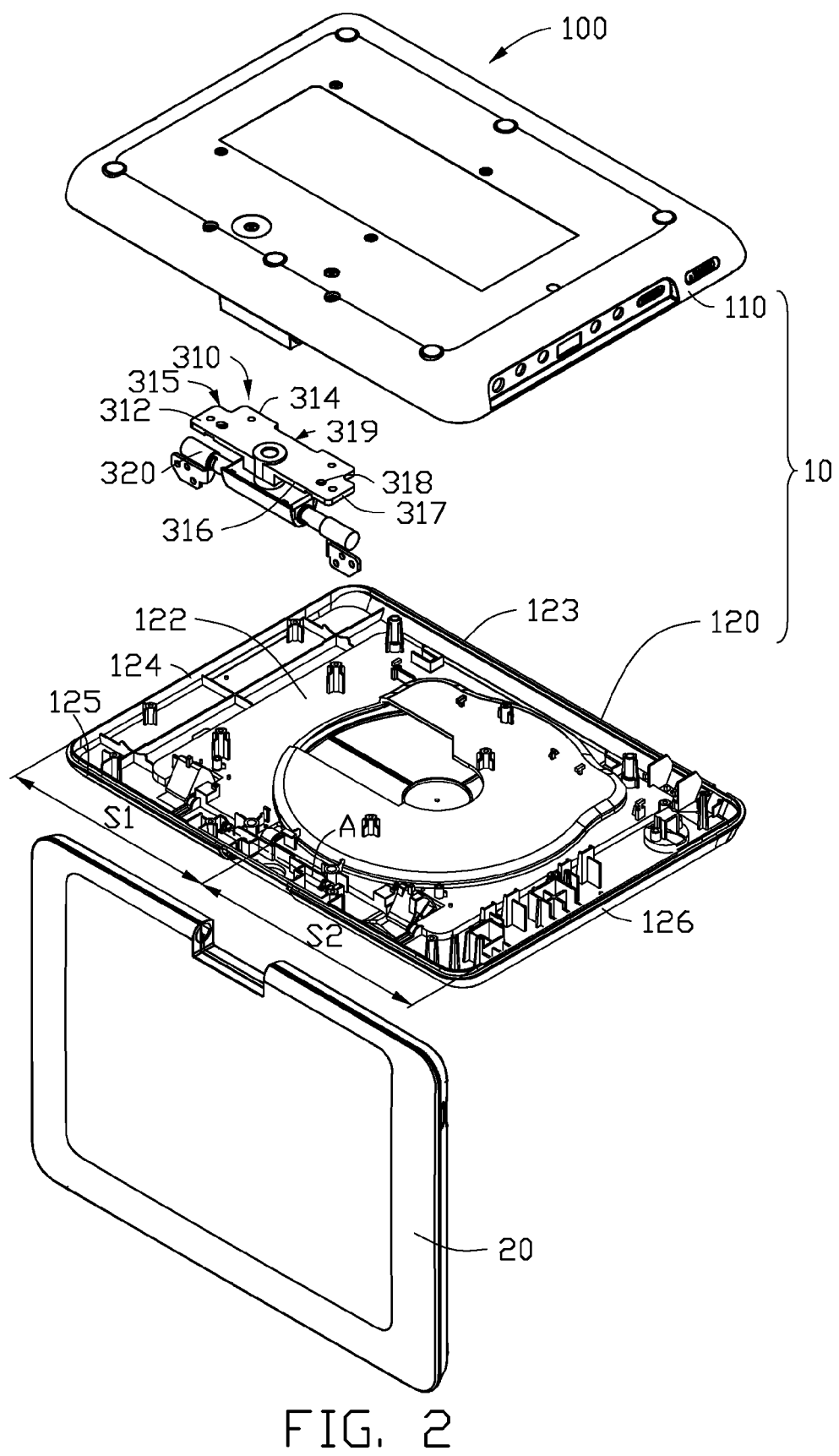
FIG. 2 is a disassembled perspective view of the electronic device of FIG. 1.

Referring also to FIG. 2, the body 10 includes a bottom case 110 and a top case 120 engaging with the bottom 110. The bottom case 110 and the top case 120 cooperatively define a receiving space (not labeled) for accommodating components, such as a motherboard, a processor, a disc drive, and other components (not shown) for the functionality of the electronic device 100.

The top case 120 includes a substantially rectangular base 122 and four sidewalls (hereinafter, a first sidewall 123, a second sidewall 124, a third sidewall 125, and a fourth sidewall 126) respectively projecting from the four rims of the base 122. The first sidewall 123, the second sidewall 124, the third sidewall 125 opposite the first sidewall 123, and the fourth sidewall 126 opposite the second sidewall 124 are interconnected with each other.

Figure 3:
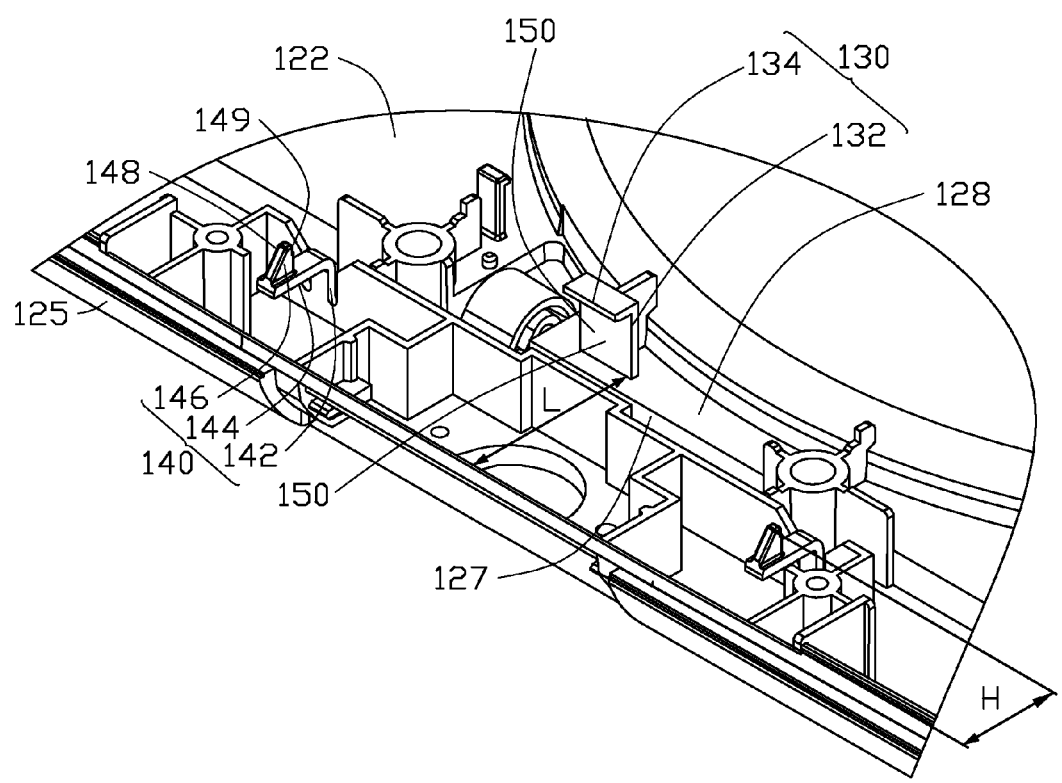
FIG. 3 is a partially enlarged view of a portion of the body in FIG. 2.
Figure 4:
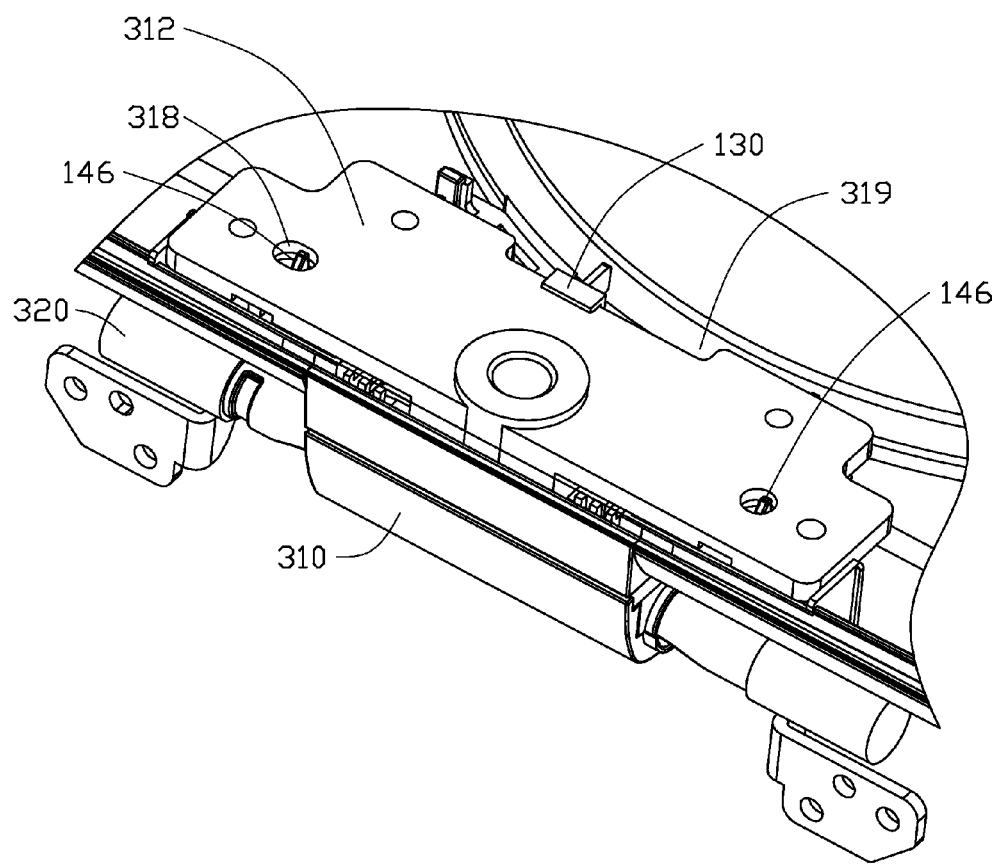
FIG. 4 is a partially assembled perspective view showing the hinge mechanism mounted to the body in FIG. 2.

Referring to FIG. 3, a supporting plate 127 integrally projects from an inner surface of the base 122. The supporting plate 127 is adjacent to the third sidewall 125 and is adapted to support the hinge mechanism 30. The supporting plate 127 has a supporting surface 128 parallel to the base 122. A holding member 130 projects from the supporting plate 127. The distance S1 between the holding member 130 and the second sidewall 124 is substantially equal to the distance S2 between the holding member 130 and the fourth sidewall 126 (see FIG. 2). The holding member 130 includes a resisting portion 132 perpendicularly connecting to the supporting surface 128 and a latching portion 134. The latching portion 134 perpendicularly extends from an end of the resisting portion 132 away from the supporting plate 127 and extends toward the third sidewall 125. The latching portion 134 is parallel to the supporting surface 128. The latching portion 134 and the supporting plate 127 cooperatively define a clearance 150 therebetween for holding the hinge mechanism 30. The resisting portion 132 is deformable. In the embodiment, the resisting portion 132 is made of elastic material. When the latching portion 134 is pushed, the resisting portion 132 elastically deforms, and the latching portion 134 moves towards or away from the third sidewall 125.

Two locking members 140 project from the base 122 and are arranged between the third sidewall 125 and the holding members 130. The two locking members 140 are aligned parallel to the third sidewall 125. The two locking members 140 and the holding member 130 are arranged in a triangle. The distance H between the line A and the third sidewall 125 is less than the distance L between the holding member 130 and the third sidewall 125.

Each locking member 140 includes a connecting portion 142, a supporting portion 144 and a hook 146. The connecting portion 142 projects up from the base 122. The supporting portion 144 perpendicularly extends from an end of the supporting portion 144 away from the base 122. The supporting portion 144 extends toward the third sidewall 125 and is substantially coplanar with the supporting surface 128. The hook 146 projects from a side of the supporting portion 144 opposite to the base 122, and is arranged adjacent to an end of the supporting portion 144 away from the connecting portion 142. The hook 146 is substantially triangular, it defines an inclined surface 148 facing the third sidewall 125 and an upright surface 149 opposite to the third sidewall 125.

Again referring to FIG. 2, the hinge mechanism 30 includes a fixing plate 310 and a rotating portion 320 rotatably coupled to the fixing plate 310. The fixing plate 310 is secured to the body 10, and the rotating portion 310 is secured to the cover 20, whereby the cover 20 is rotatably coupled to the body 10.

The thickness of the fixing plate 310 is slightly less than the width of the clearance 150, such that the fixing plate 310 is capable of being received in the clearance 150. The fixing plate 310 includes four side ends (hereinafter, a first side end 314, a second side end 315, a third side end 316 opposite to the first side end 314, and a fourth side end 317 opposite to the second side end 315). The four side ends 314, 315, 316, 317 serially interconnect. The fixing plate 310 defines two latching holes 318 corresponding to the hooks 146. The latching holes 318 are arranged adjacent to the third side end 315. The middle portion of the first side end 314 is broadly notched (notching 319). The notching 319 corresponds to the holding member 130.

In assembly, firstly, the notching 319 of the fixing plate 310 is inserted into the clearance 150; Secondly, the fixing plate 310 deforms the resisting portion 132, and is latched under the latching portion 134. The hooks 146 are received in the latching holes 318 of the fixing plate 310. Thus, when the resisting portion 132 attempts to return towards its original position, the hooks 146 and the revisiting portion 132 cooperatively limit the movement of the fixing plate 310 in a plane parallel to the supporting surface 128. Then, the top case 120 is secured to the bottom case 110, and the fixing plate 310 is further sandwiched between the supporting plate 127 as well as by the supporting portion 144 and the bottom surface 110. As a result, the fixing plate 310 is firmly secured to the body 10. Finally, the rotating portion 320 of the hinge mechanism 30 is secured to the cover 20.

Therefore, by virtue of the holding member 130 and the latching member 140 of the body 10, the hinge mechanism 30 is secured to the body 10 without tools and with minimal finger pressure.

Even though information and the advantages of the present embodiments have been set forth in the foregoing description, together with details of the structures and functions of the present embodiments, the disclosure is illustrative only; and changes may be made in detail, especially in matters of the shape, size, and arrangement of parts within the principles of the present embodiments to the full extent indicated by the broad general meaning of the terms in which the appended claims are expressed.

What is claimed is:

1. An electronic device, comprising:
a body comprising a base; and
a hinge mechanism secured to the body, the hinge mechanism comprising a fixing plate;
wherein at least one holding member and at least one latching members project from the base, an end of the at least one holding member away from the base bends toward the at least one latching member to form a latching portion, each latching member comprising a connecting portion projects from the base, a supporting portion bending from an end of the connecting portion away from the base, and a hook arranged at a side of the supporting portion away from the connecting portion, the latching portion cooperate with the supporting portion to define a clearance for holding the fixing plate, the hook cooperates with the at least one holding member to secure the fixing plate to the body.

2. The electronic device of claim 1, wherein the at least one holding member is deformable.

3. The electronic device of claim 1, wherein the at least one holding member comprise a resisting portion perpendicular to the base and a latching portion, the latching portion perpendicularly bends from an end of the resisting portion opposite to the base and extends toward the at least one latching member.

4. The electronic device of claim 3, wherein the resisting portion is deformable.

5. The electronic device of claim 4, wherein the latching portion is parallel to the supporting portion, the latching portion and the supporting portion cooperatively define the clearance therebetween.

6. The electronic device of claim 1, wherein a holding member and two latching members project from the base.

7. The electronic device of claim 6, wherein the holding member and the two latching members are arranged in a triangle.

8. The electronic device of claim 7, wherein the fixing plate defines two latching holes corresponding to the two latching members and a notch corresponding to the holding member, the hooks of the latching members are respectively latched to the latching holes, and the notch resists against the resisting portion of the holding member.

9. The electronic device of claim 7, wherein a supporting plate having a supporting surface projects from the base, the holding member projects from the supporting plate.

10. The electronic device of claim 9, wherein the supporting surface and the supporting portion of the latching member are coplanar.

11. The electronic device of claim 10, wherein the supporting portion and the latching portion cooperatively define the clearance.

12. An electronic device, comprising:
a body comprising a base;
a hinge mechanism secured to the body, the hinge mechanism comprising a fixing plate;
at least one latching members project from the base, the at least one latching member comprising a connecting portion projects from the base, a supporting portion bends from an end of the connecting portion away from the base, and a hook arranged at a side of the supporting portion away from the connecting portion; and
at least one holding member project from the base, an end of the at least one holding member away from the base bending toward the at least one latching member to form a latching portion;
wherein the supporting portion extends in a direction opposite to the at least one holding member, the latching portion cooperates with the supporting portion to define a clearance for holding the fixing plate, the hook cooperates with the at least one holding member to secure the fixing plate to the body.

13. The electronic device of claim 12, wherein the at least one holding member is deformable.

14. The electronic device of claim 12, wherein the at least one holding member comprise a resisting portion perpendicular to the base and a latching portion, the latching portion perpendicularly bends from an end of the resisting portion opposite to the base and extends toward the at least one latching member.

15. The electronic device of claim 14, wherein the resisting portion is deformable.

16. The electronic device of claim 15, wherein the latching portion is parallel to the supporting portion, the latching portion and the supporting portion cooperatively define the clearance therebetween.

17. The electronic device of claim 12, wherein a holding member and two latching members project from the base.

18. The electronic device of claim 17, wherein the holding member and the two latching members are arranged in a triangle.

19. The electronic device of claim 17, wherein the fixing plate defines two latching holes corresponding to the two latching members and a notch corresponding to the holding member, the hooks of the latching members are respectively latched to the latching holes, and the notch resists against the resisting portion of the holding member.

* * * * *